(12) United States Patent
Suh et al.

(10) Patent No.: US 8,225,482 B2
(45) Date of Patent: Jul. 24, 2012

(54) MANUFACTURING METHOD OF WAVEGUIDE HAVING A METAL ALIGNMENT MARK

(75) Inventors: Sung-dong Suh, Seoul (KR); Eun-hyoung Cho, Seoul (KR); Jin Seung Sohn, Seoul (KR)

(73) Assignee: Seagate Technology International, Grand Cayman (KY)

( * ) Notice: Subject to any disclaimer, the term of this patent is extended or adjusted under 35 U.S.C. 154(b) by 1215 days.

(21) Appl. No.: 11/972,207

(22) Filed: Jan. 10, 2008

(65) Prior Publication Data

US 2008/0212230 A1    Sep. 4, 2008

(30) Foreign Application Priority Data

Jan. 10, 2007  (KR) .................. 10-2007-0003058

(51) Int. Cl.
*H01S 4/00*    (2006.01)
(52) U.S. Cl. ............................ 29/592.1; 29/600; 385/14

(58) Field of Classification Search ............ 29/830–831, 29/846–847, 592.1, 600, 603.12; 385/14, 385/129, 130–131, 140, 47, 39; 333/239
See application file for complete search history.

(56) References Cited

U.S. PATENT DOCUMENTS

| 6,873,751 B2 * | 3/2005 | Nishizawa et al. ............... 385/8 |
| 6,909,818 B2 * | 6/2005 | Tsushima et al. .............. 385/14 |
| 7,203,388 B2 * | 4/2007 | Ha et al. ....................... 385/14 |

FOREIGN PATENT DOCUMENTS

JP    2006-243145    *  9/2006

* cited by examiner

*Primary Examiner* — Minh Trinh
(74) *Attorney, Agent, or Firm* — Hollingsworth & Funk, LLC

(57) ABSTRACT

A manufacturing method of a waveguide structure includes forming a metal layer of a predetermined size on a substrate to form a structure, forming a lower clad layer on the structure in order to completely cover the metal layer, forming a core layer of a predetermined size on the lower clad layer at the location corresponding to the metal layer, and forming an upper clad layer thereon in order to completely cover the core layer.

6 Claims, 17 Drawing Sheets
(2 of 17 Drawing Sheet(s) Filed in Color)

After Dry Etch in $O_2$

10μm

Patterned Au Mark

5μm

Fiber Mode

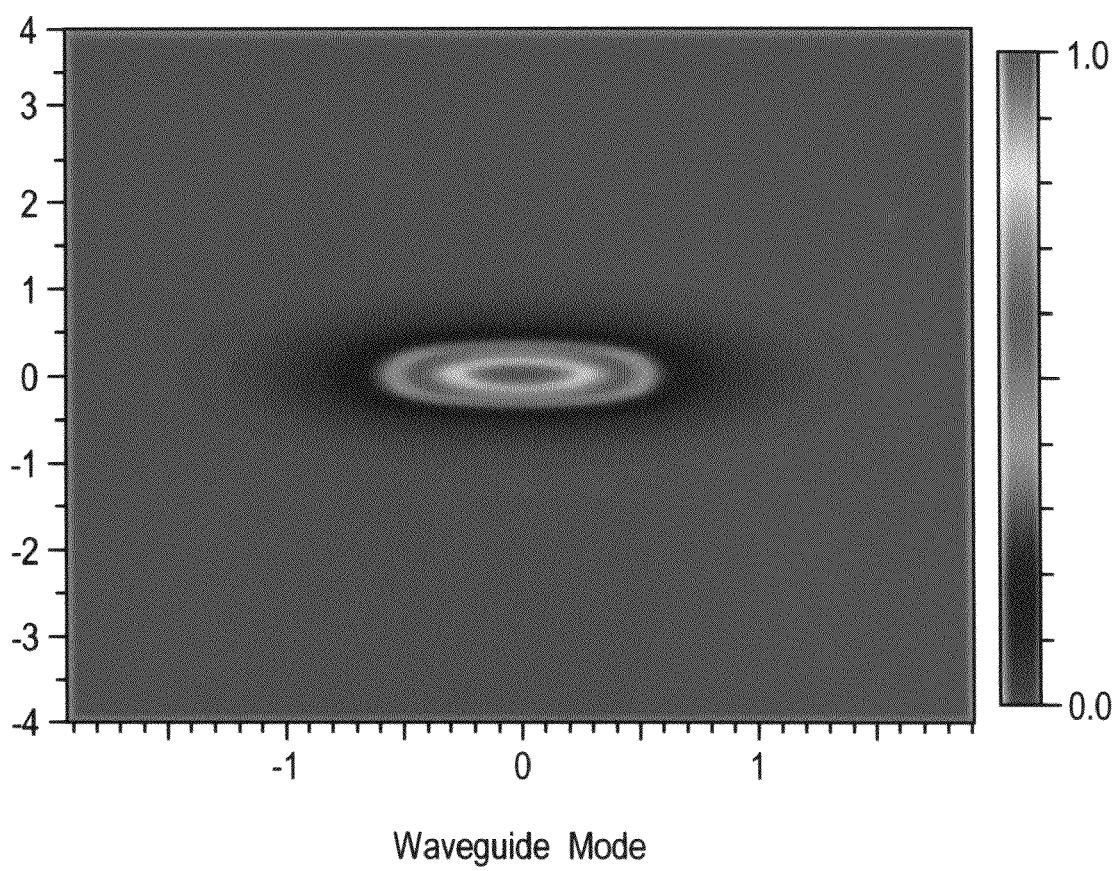

MANUFACTURING METHOD OF WAVEGUIDE HAVING A METAL ALIGNMENT MARK

CROSS-REFERENCE TO RELATED PATENT APPLICATION

This application claims the benefit of Korean Patent Application No. 10-2007-0003058, filed on Jan. 10, 2007, in the Korean Intellectual Property Office, the disclosure of which is incorporated herein in its entirety by reference.

BACKGROUND OF THE INVENTION

1. Field of the Invention

The present invention relates to a waveguide structure, a manufacturing method thereof and a heat assisted magnetic recording head (HAMR) using the same, and more particularly to a waveguide structure, a manufacturing method thereof and a heat assisted magnetic recording head, wherein the improvement of beam intensity and the maintenance of a single focusing spot are attained even after an input beam passes through a nano-aperture.

2. Description of the Prior Art

As generally known in the art, the practice of magnetic recording in which only a magnetic field is utilized for recording data has a limitation in high-density recording due to thermal instability. As an alternative to overcome this shortcoming, a heat assisted magnetic recording head (HAMR) to which a light transmission module is applied has been disclosed, wherein the recording is accelerated by locally heating a magnetic recording medium with a light emission and temporarily reducing coercive force.

FIG. 1 schematically shows a conventional heat assisted magnetic recording (HAMR) head 10. The conventional HAMR head 10 comprises a magnetic recording unit 20 and a light transmission module 30 for heating a magnetic recording medium 40.

The magnetic recording unit 20 includes a recording pole 21 for applying the magnetic recording field to the magnetic recording medium 40 and a return pole 25 for being connected to the recording pole 21 through a yoke 23 and forming a magnetic path.

The light transmission module 30, which serves to heat the predetermined area A of the magnetic recording medium 40 through a near-field emission, includes a light source 31 and a waveguide 35 for guiding the light emitted from the light source 31. Here, the light source 31 is coupled to the waveguide 35 through an optic fiber 33 for transmitting the light and a stack-type spherical surface lens 34 for collimating the light emitted from the optic fiber 33.

Here, the magnetic recording medium 40 moves relatively to the HAMR head 10 in a direction indicated by an arrow D and the heated area A is located on the recording pole 21 by the relative movement of the magnetic recording medium 40. Thus, the recording pole 21 can perform a vertical magnetic recording on the heated area, so that the magnetic recording can be attained without thermal instability.

As described herein before, the conventional HAMR head 10 comprises such a structure that the waveguide 35 is attached to the outer side of the recording pole 21 in associating the magnetic recording unit 20 with the light transmission module 30. Accordingly, a certain distance can be maintained between the waveguide 35 and the magnetic recording medium 40 when the magnetic recording unit 20 buoys from the magnetic recording unit 20 by means of an air bearing.

On the other hand, in order to locally provide the HAMR head 10 with the heat source, the light (or the beam) should be delivered to a nano-aperture 37 located at an end of the waveguide 35 and the beam passing through the nano-aperture 37 can cause local application of the heat while effecting the field enhancement.

However, in the conventional HAMR head having the above-described structure, the beam passing through the nano-aperture 37 causes the order difference of two magnitudes to occur due to the small outline package (SOP) of the input beam. (L. Hasselink: Proc, SPIE, Vol. 4342. pp 325 (2002)).

Also, if a profile of the 3D waveguide is similar to a slab for the purpose of attaining a high polarization dependent loss (PDL) as in a cavity of a laser diode, coupling of the light source to the waveguide becomes difficult and thus an efficient system can not be obtained.

Further, due to the small outline package (SOP) of the input beam, differences may occur in intensity distribution of the beam spot formed after passing through the nano-aperture 37, and there may be two peaks when the polarization of the input beam is not appropriately controlled. (Jiying Xu: Opt. Engr. Vol. 44. pp 01800-1 (2005)).

Further, since the loss of the beam and the polarization in an undesirable direction occur when the beam is transmitted through the waveguide 35, there are the problems in that the beam intensity decreases and the shape of the beam changes after passing through the nano-aperture 37.

SUMMARY OF THE INVENTION

Accordingly, the present invention has been made to solve the above-mentioned problems occurring in the prior art, and an object of the present invention is to provide a waveguide structure, a manufacturing method thereof and a heat assisted magnetic recording head (HAMR) using the same, wherein a metal alignment mark is formed under a lower clad in order to reduce beam-loss while passing through a waveguide and to efficiently remove polarization present in an undesirable direction, so that the beam intensity and the shape of the beam don't change even after an input beam passes through a nano-aperture.

Further, another object of the present invention is to provide a waveguide structure, a manufacturing method thereof and a heat assisted magnetic recording head (HAMR) using the same, wherein a metal alignment mark is formed under the lower clad, so that it is possible to efficiently remove transverse magnetic (TM) mode and to efficiently determine a location of a nano-aperture to be formed.

Further, another object of the present invention is to provide a waveguide structure, a manufacturing method thereof and a heat assisted magnetic recording head (HAMR) using the same, wherein the thickness of the lower clad is properly maintained, so that propagation loss can be minimized from an absorbing material, such as metal.

In order to accomplish these objects, in accordance with the present invention, there is provided a manufacturing method of a waveguide comprising the steps of: (a) forming a metal layer of a predetermined size on a substrate; (b) forming a lower clad layer on the structure made in the step (a) in order to completely cover said metal layer; (c) forming a core layer of a predetermined size on said lower clad layer at a location corresponding to said metal layer; and (d) forming an upper clad layer on the structure made in the step (c) in order to completely cover said core layer.

Here, the lower clad layer and the upper clad layer can be formed either from the same materials or different materials, while the lower and the upper clad layers are made from the materials of which reflective coefficients are selected to be lower than that of the core layer.

Also, the metal layer is formed to be thicker than a skin depth.

Further, the step (a) further comprises forming a promoter layer before forming said metal layer on said substrate.

In accordance with another aspect of the present invention, there is provided a waveguide comprising: a metal layer of a predetermined size formed on a substrate; a lower clad layer formed on said substrate for completely covering said metal layer; a core layer of a predetermined size formed on said lower clad layer at a location corresponding to said metal layer; and an upper clad layer formed on said lower clad layer in order to completely cover said core layer, wherein said lower clad layer and said upper clad layer are formed either from the same materials or different materials, while said lower clad layer and said upper clad layers are made from the materials of which reflective coefficients are selected to be lower than that of the core layer.

Further, in accordance with another aspect of the present invention, there is provided a heat assisted magnetic recording head comprising: a waveguide for guiding a light emitted from a light source; and a nano-aperture for changing light energy distribution transmitted through said waveguide and forming an intensified near-field, wherein said waveguide comprises: a metal layer of a predetermined size formed on a substrate; a lower clad layer formed on said substrate for completely covering said metal layer; a core layer of a predetermined size formed on said lower clad layer at a location corresponding to said metal layer; and an upper clad layer formed on said lower clad layer in order to completely cover said core layer, wherein said lower clad layer and said upper clad layer are formed either from the same materials or different materials, while said lower clad layer and said upper clad layers are made from the materials of which reflective coefficients are selected to be lower than that of the core layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will be more apparent from the following detailed description taken in conjunction with the accompanying drawings, in which:

FIGS. 5A-5B and 6A-6E are simulation results illustrating nano-aperture performance with respect to an input beam SOP, wherein FIGS. 5A-5B is the simulation result showing a polarity effect during a field increasing period and FIGS. 6A-6E is the simulation result showing a polarity effect in an intensity distribution period.

FIGS. 8A-8B are enlarged photographs showing a comparison between a fiber mode and a waveguide mode in accordance with the present invention.

DETAILED DESCRIPTION OF THE PREFERRED EXAMPLARY EMBODIMENTS

Figure 1:
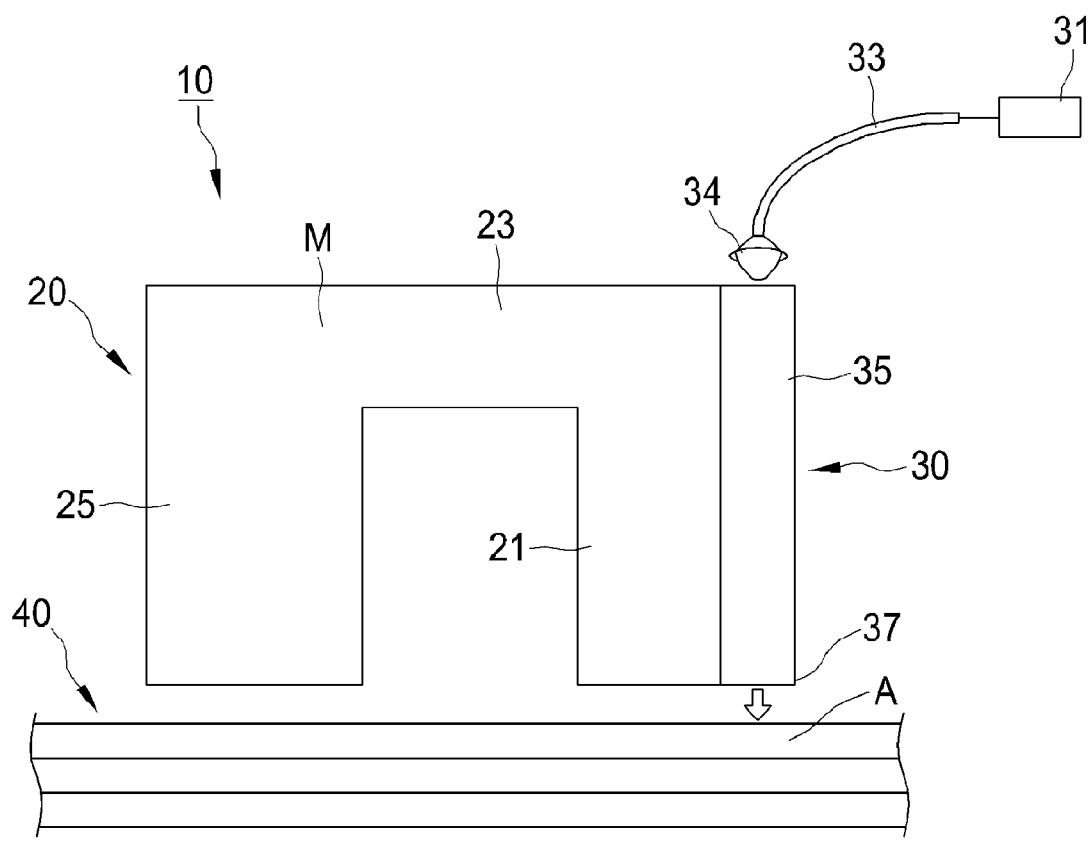
FIG. 1 schematically shows a conventional heat assisted magnetic recording head.

Hereinafter, a preferred exemplary embodiment of the present invention will be described with reference to the accompanying drawings. In the following description and drawings, the same reference numerals are used to designate the same or similar components, and so repetition of the description on the same or similar components will be omitted.

A waveguide structure, a manufacturing method thereof and a heat assisted magnetic recording head using the same are provided. A heat assisted portion comprises a waveguide and a nano-aperture formed at an end of the waveguide. An alignment mark is formed under a lower clad layer in order to make the waveguide and the nano-aperture an integrated type. Accordingly, there are advantages in that a location of an aperture to be formed may be readily determined, the propagation loss due to the presence of metal may be minimized by appropriately adjusting the thickness of the lower clad layer and it is possible to remove an undesired mode. As a result, the improvement of the beam intensity and the maintenance of the single spot may be possible even after the input/beam passes through the nano-aperture. These features will now be more fully described.

Waveguide Structure

Figure 2:
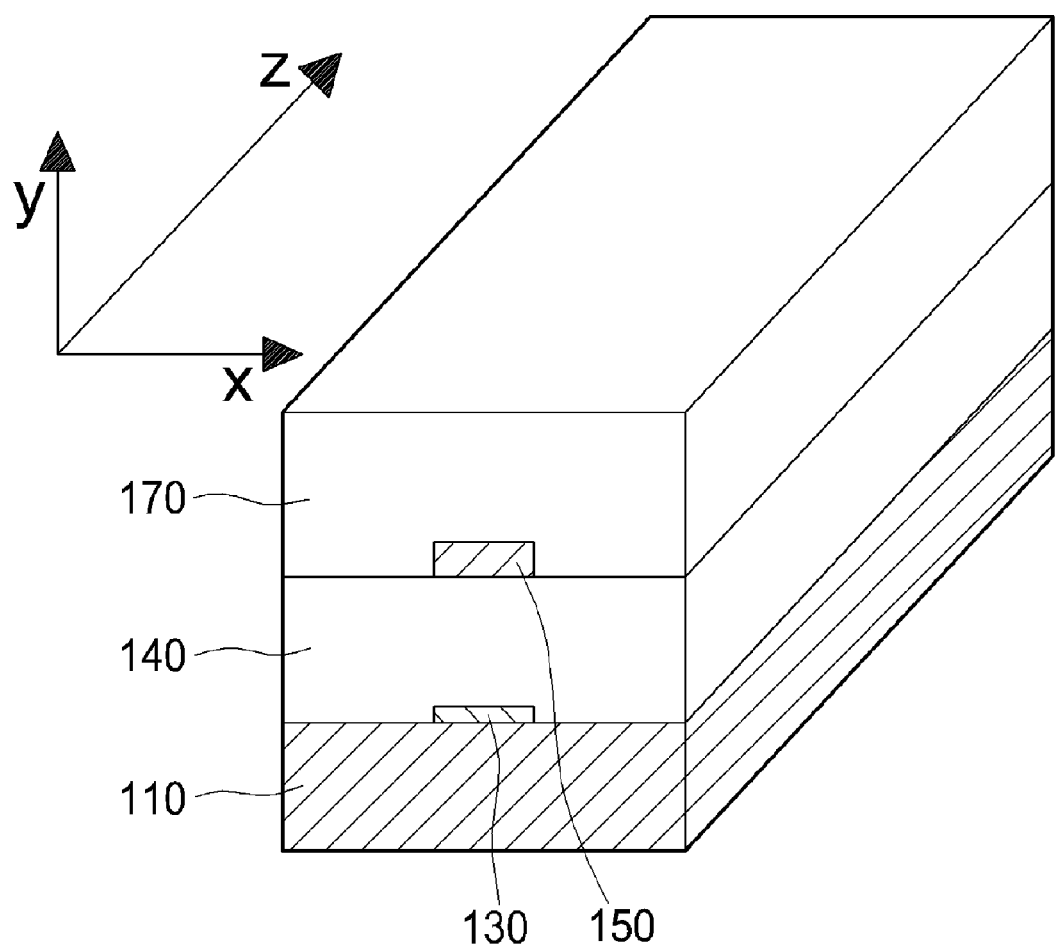
FIG. 2 shows a configuration of a waveguide in accordance with a preferred exemplary embodiment of the present invention, in which an end cross-section of the waveguide to be formed with a nano-aperture is illustrated.

FIG. 2 shows a waveguide structure of a preferred embodiment in accordance with the present invention, in which an end cross-section of the waveguide is to be formed with a nano-aperture.

The waveguide comprises: a metal layer 130 formed on a substrate 110; a lower clad layer 140 of a predetermined thickness formed on the substrate 110 having said metal layer 130 formed thereon; a core layer 150 formed on said lower clad layer 140; and an upper clad layer 170 of a predetermined thickness formed on the lower clad layer 140 having said core layer 150 formed thereon.

As in the above-described structure, since there is the metal layer 130 patterned under said lower clad layer 140, it is not only possible to efficiently absorb TM mode, but also possible to efficiently determine the location at which the nano-aperture is to be formed. Here, the above-mentioned metal layer 130 is, for instance, preferably formed from gold (Au).

The thickness of said lower clad layer 140 formed on said metal layer 130 may be selected to efficiently remove the TM Mode effects while minimizing the propagation loss of the beam. Also, an over-disposed structure takes a channel form serving as the waveguide.

Figure 5A:
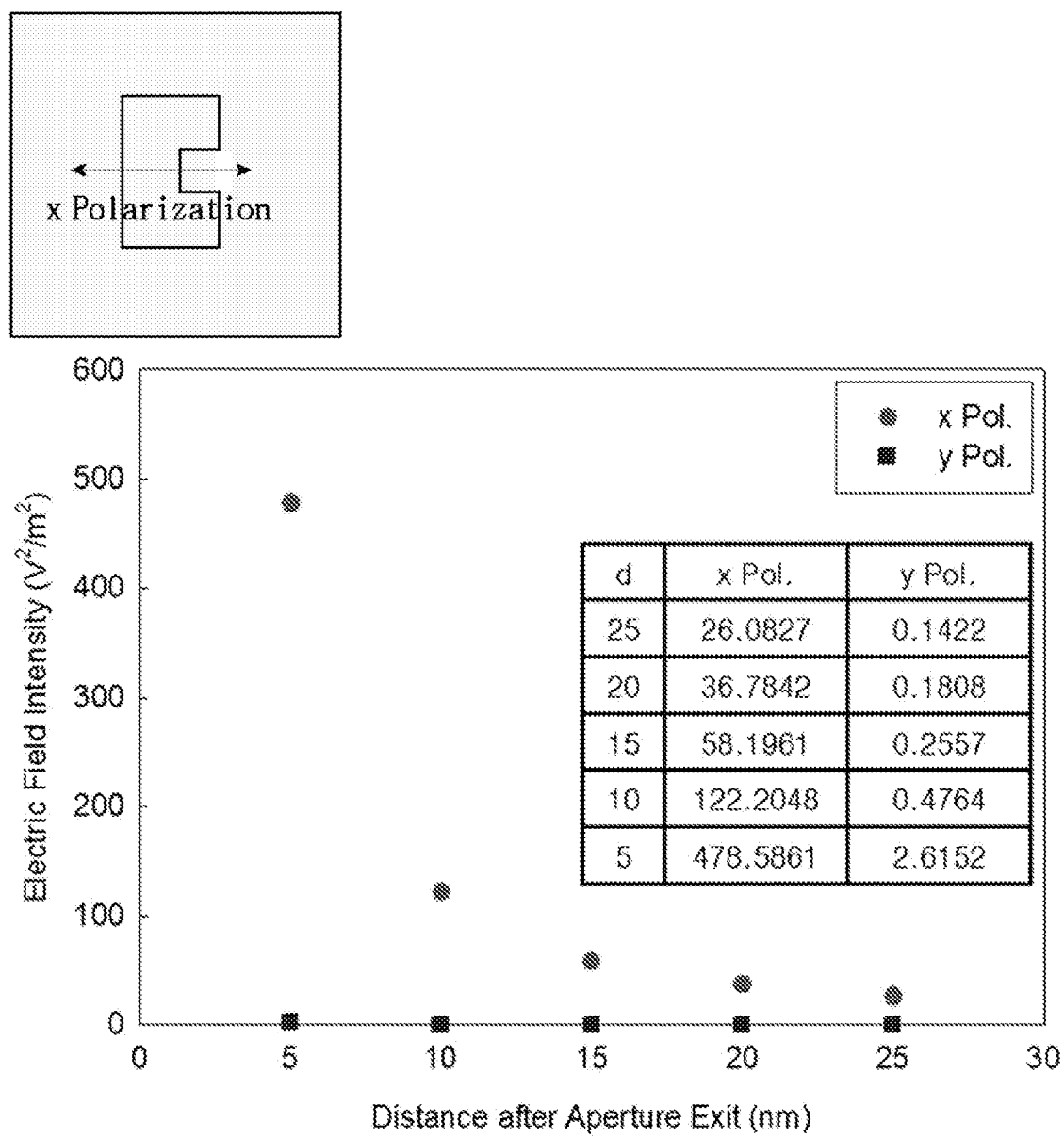
Figure 5B:
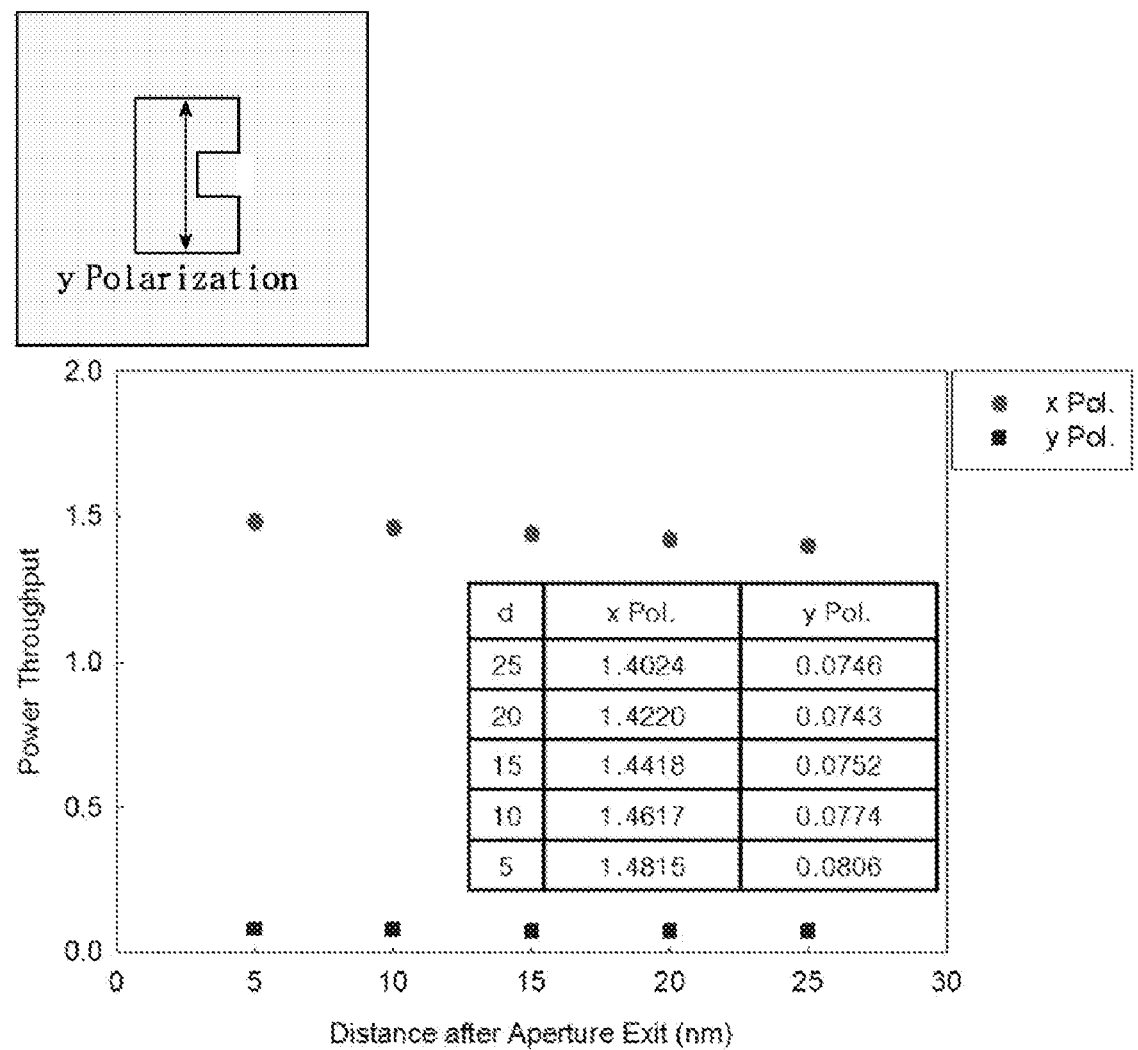
Figure 6A:
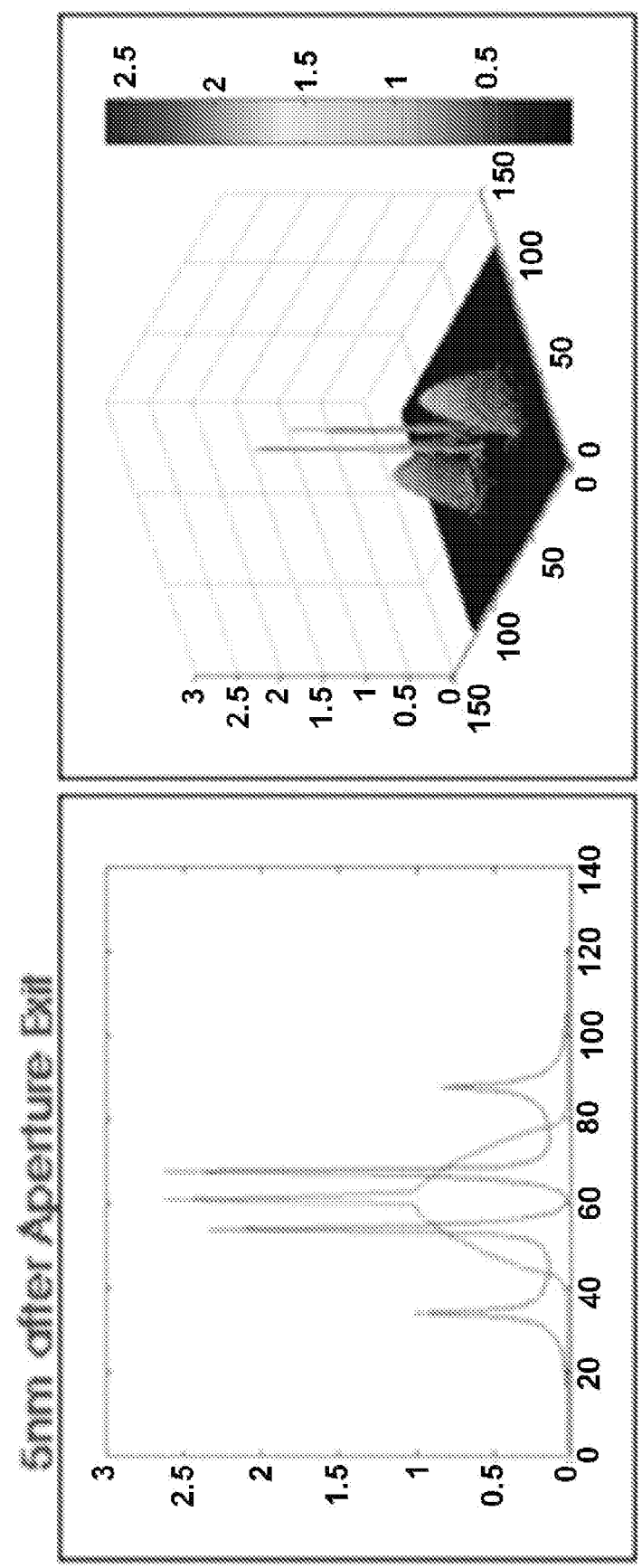
Figure 6B:
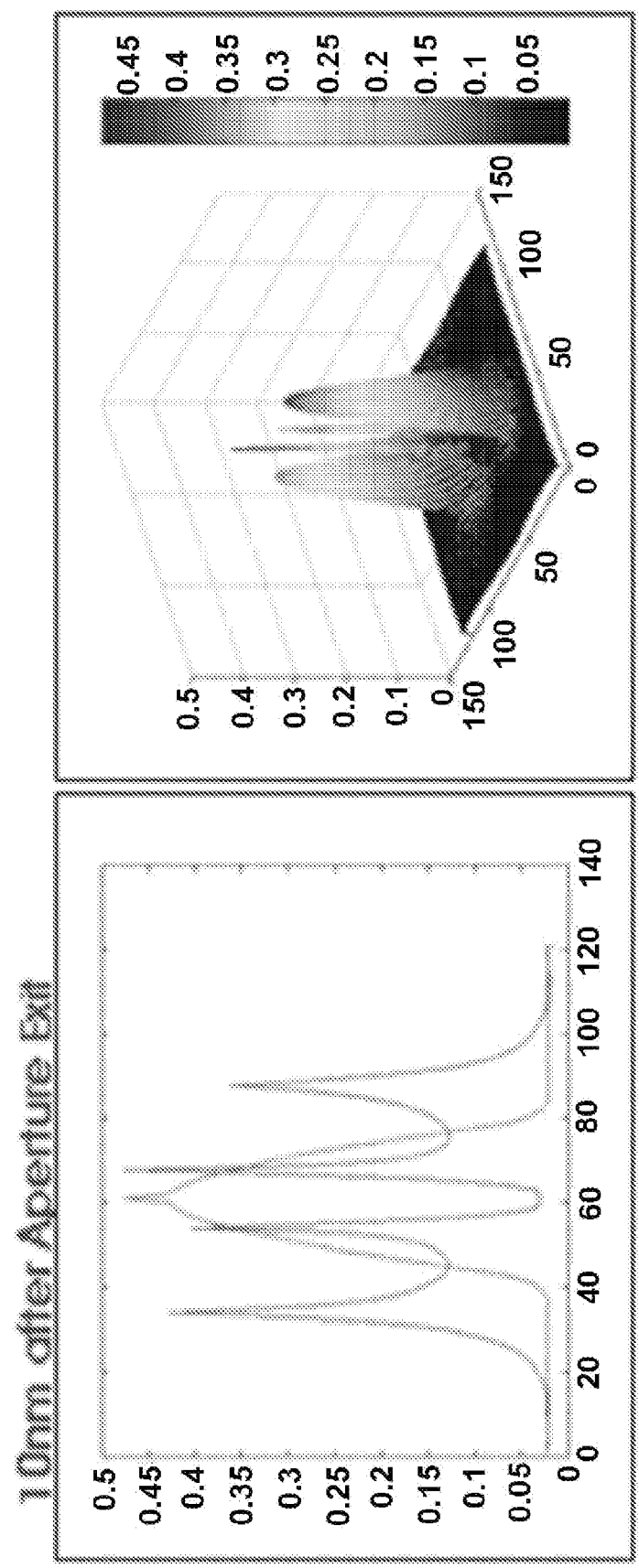
Figure 6C:
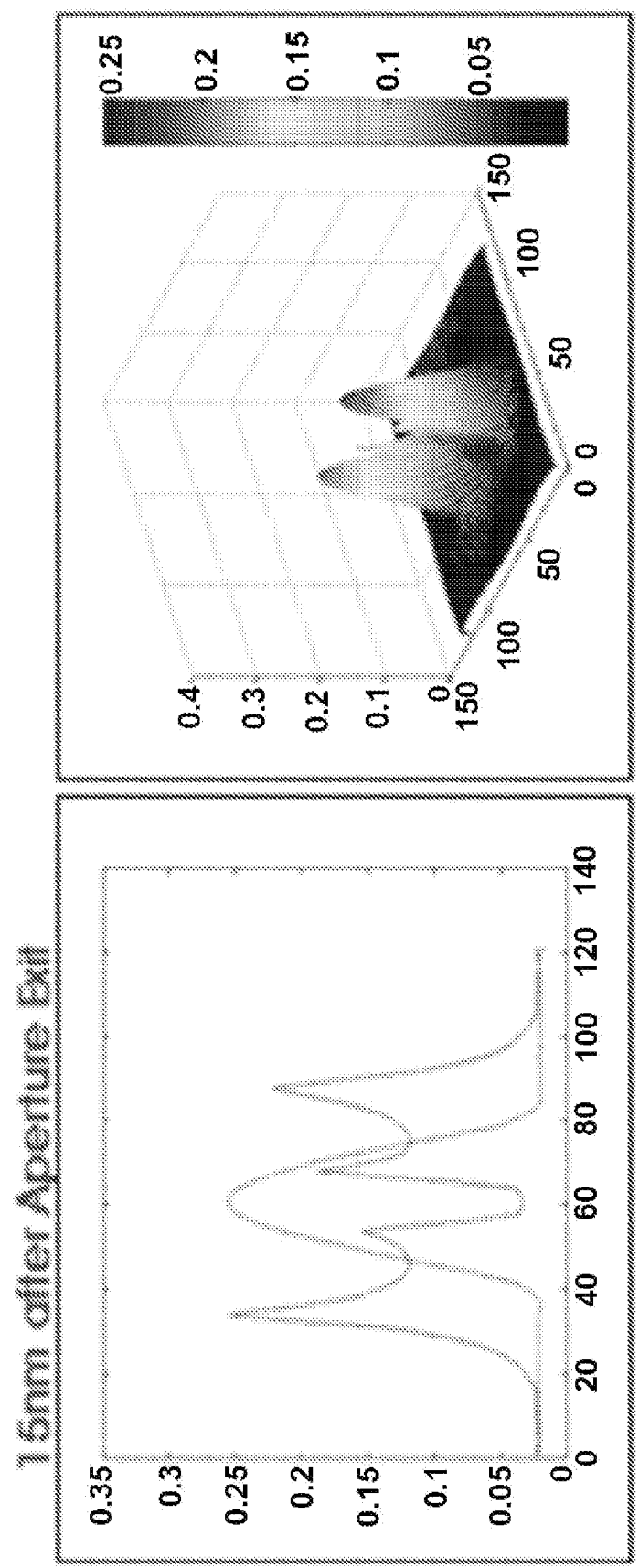
Figure 6D:
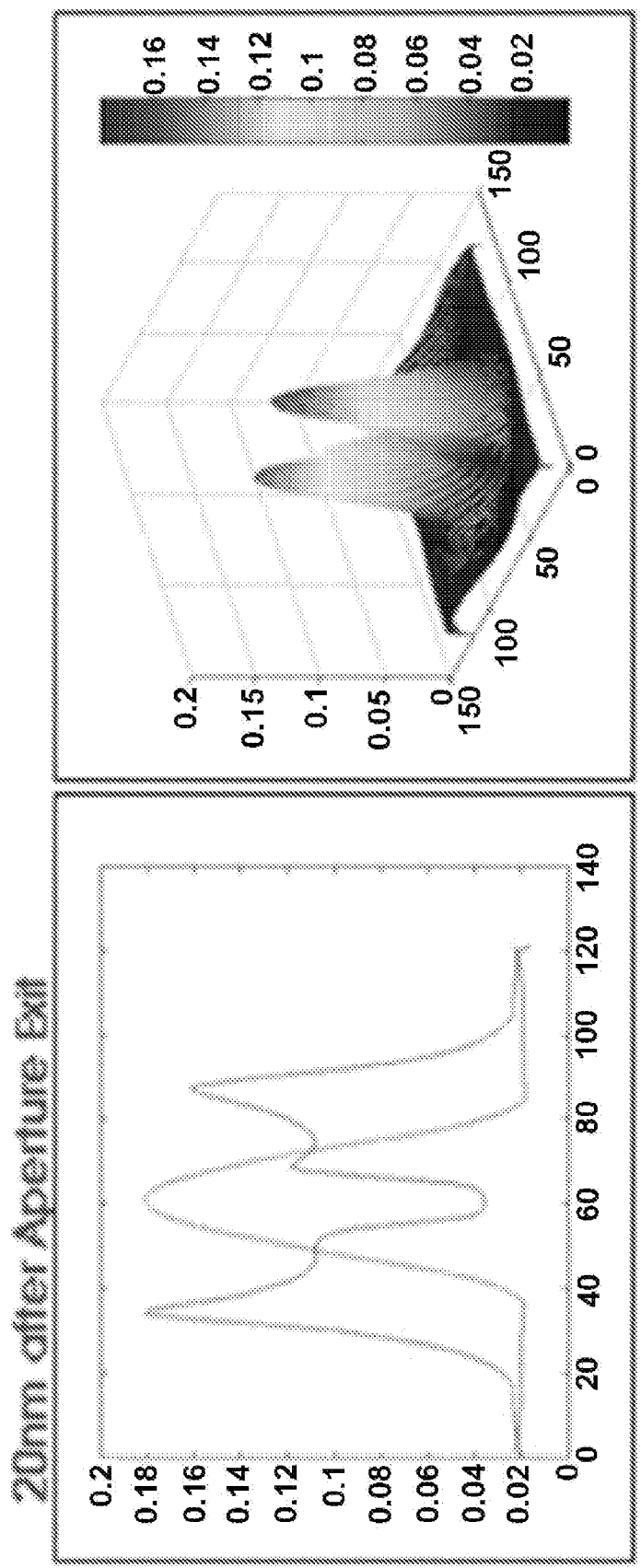
Figure 6E:
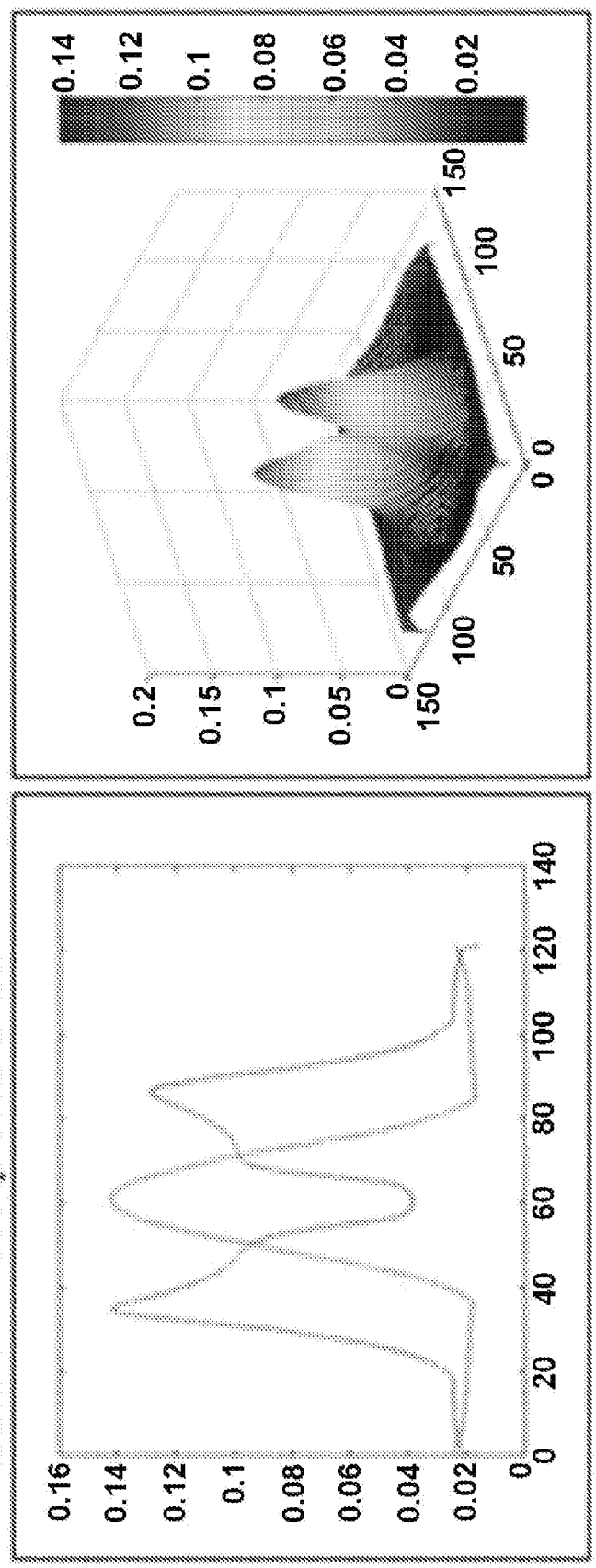
Figure 7A:
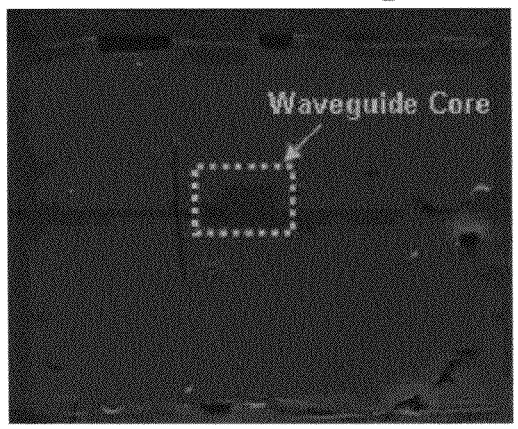
FIGS. 7A-7B are enlarged photographs showing a core and a metal portion manufactured by a method in accordance with the present invention.
Figure 7B:
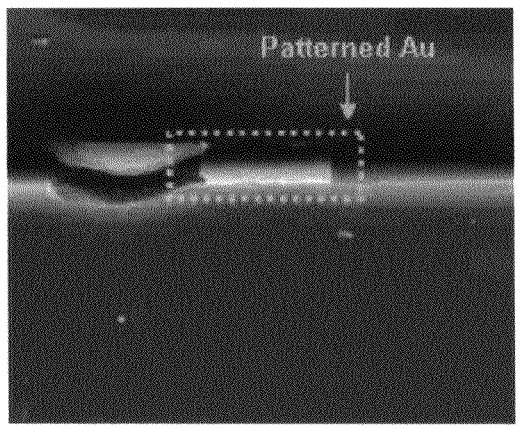
Figure 8A:
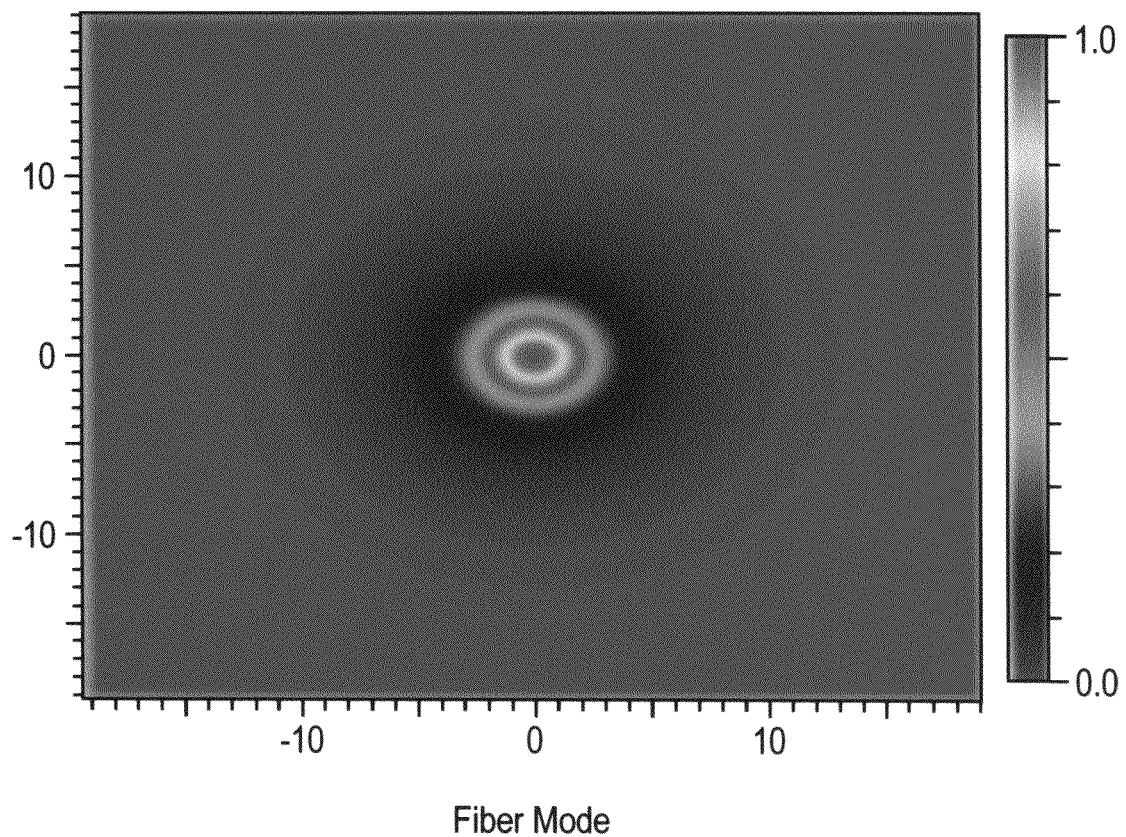

Further, as illustrated in FIGS. 5A-5B, the distinction between the core and the clad may be efficiently viewed through a short-term etching process performed under the oxygen ($O_2$) environment.

Operation Theorem

One of most important key technologies in the field of HAMR system is the beam transmission to the nano-aperture, which may minimize the beam loss and present the field enhancement for the purpose of the local heating of the recording media. Additionally, the optical property of the input beam plays an important part in the field enhancement effect and the beam shape formed through the nano-aperture.

In order to obtain a proper shape of the beam and to maximize the field enhancement effect, the SOP of the input beam is most important of all. Generally, the physical dimensions of the waveguide play an important part in determining the SOP of the guide mode. For instance, if the width of the waveguide is much larger compared to the depth thereof as in the cavity of the laser diode, the polarization will mostly occur in the widthwise direction. In this case, as the PDL increases, the field enhancement and the beam-shaping are advantageously affected, but the coupling to the waveguide will become very difficult.

Generally, unlike "a slab waveguide", the 3D waveguide has the restriction imposed on its width, and thus there are included transverse electric (TE) mode and the TM mode in the 3D waveguide at the same time. Also, the TE mode and the TM mode are not complete modes as in the slab waveguide and these modes have such a characteristic as the quasi-TE mode and quasi-TM mode.

Figure 3A:
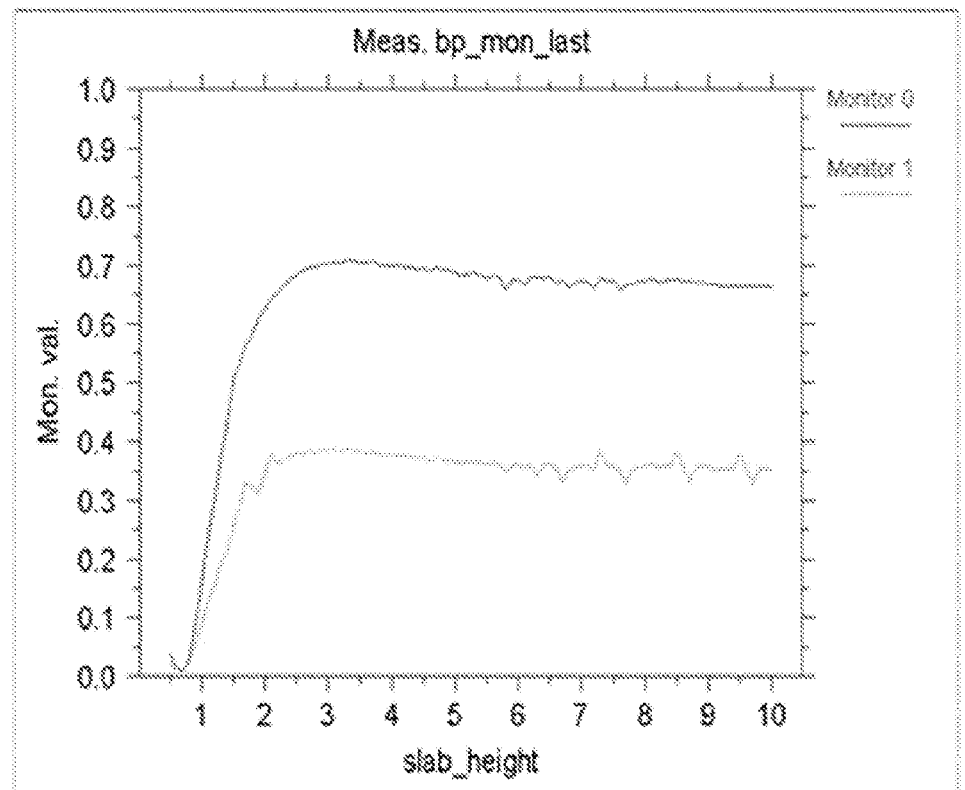
FIGS. 3A-3B show a design and a simulation result of the waveguide in accordance with the present invention.
Figure 3B:
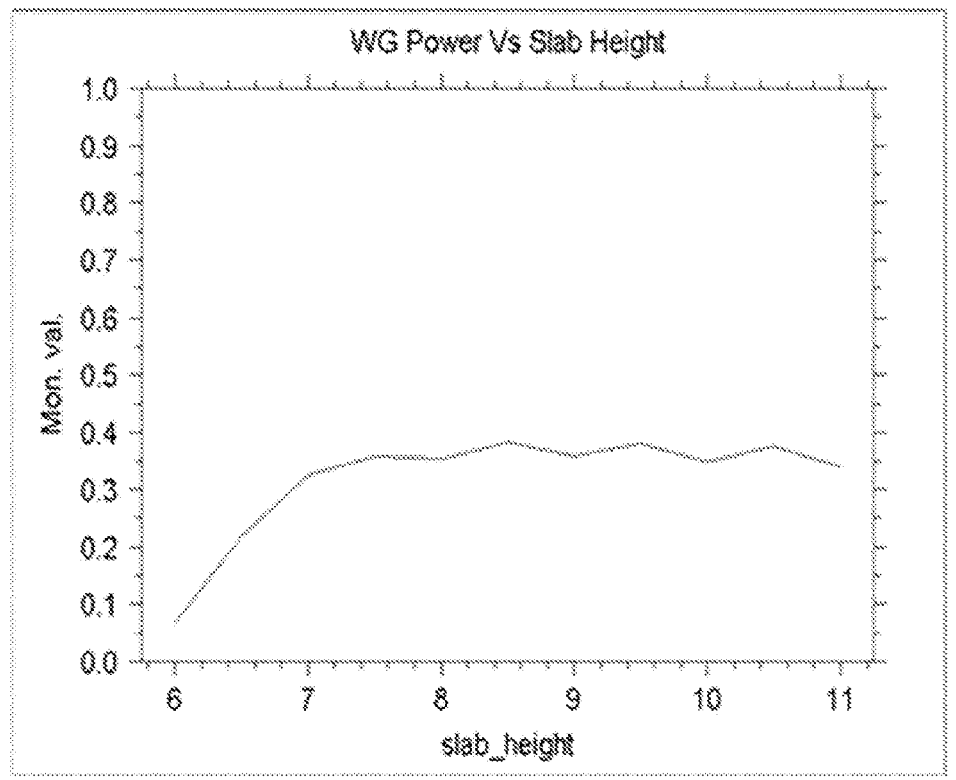

Accordingly, in the 3D waveguide, the thickness in a restricted space, i.e., the physical dimension in the Y direction should be minimized in order to maximize the polarity in the X direction. In this case, as indicated herein above, the free space optics should be adopted since the mode profile mismatch between the fiber and the waveguide is large. When considering the very small dimension of the magnetic head, such is not a preferable choice. Also, the adoption of the nano-aperture at the end of the waveguide for the purpose of attaining the field enhancement effect will become more difficult. However, as described herein before, if the metal layer is disposed under the lower clad layer and the thickness thereof is not more than an electric field magnitude (1/e) of a guide mode as shown in the simulation result of FIGS. 3A-3B, the Y-axis polarization will not be transmitted any more due to the absorption of the metal layer. Accordingly, with the use of such an effect, the beam incident into the nano-aperture can have a considerably large PDL and can optimize the thickness of the lower clad layer to thereby minimize propagation loss.

Manufacturing Method of Waveguide

FIGS. 4A-4J illustrate the manufacturing method of the waveguide in accordance with a preferred exemplary embodiment of the present invention. The manufacturing method of the waveguide of the present invention will be described herein below with reference to these drawing figures.

Figure 4A:
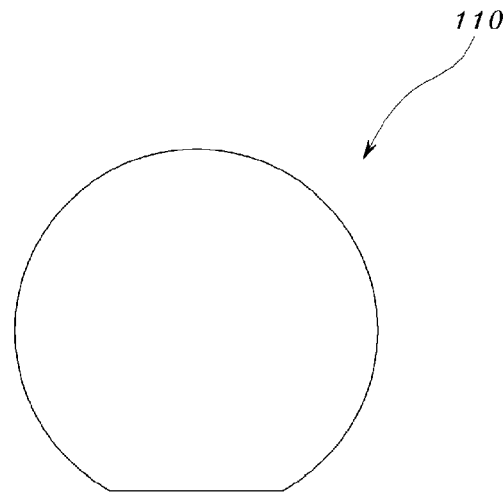
FIGS. 4A-4J illustrate a manufacturing method of the waveguide in accordance with a preferred exemplary embodiment of the present invention.

First, as illustrated in FIG. 4A, a semiconductor wafer 110 is provided.

Figure 4B:
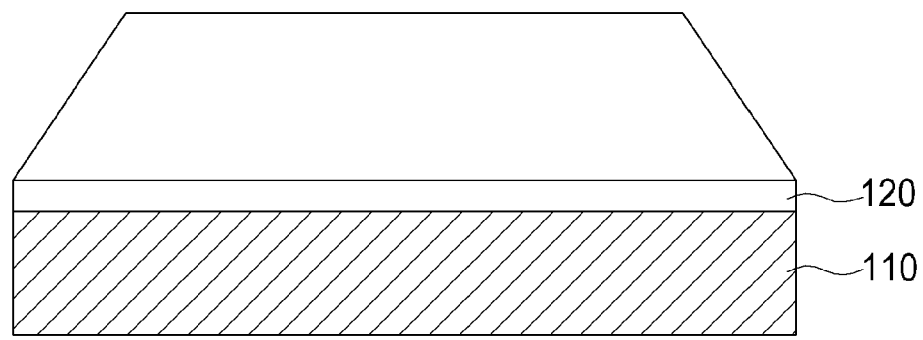

Next, as illustrated in FIG. 4B, a promoter layer 120 is formed on the semiconductor wafer 110 and then it is heat-treated.

Figure 4C:
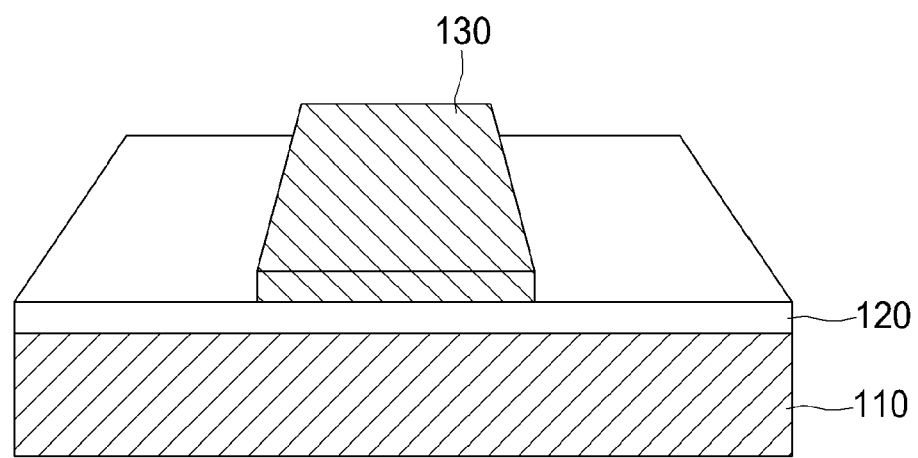

Next, as illustrated in FIG. 4C, the metal is deposited and flattened on the promoter layer 120 and the metal layer 130 is formed through patterning.

Figure 4D:
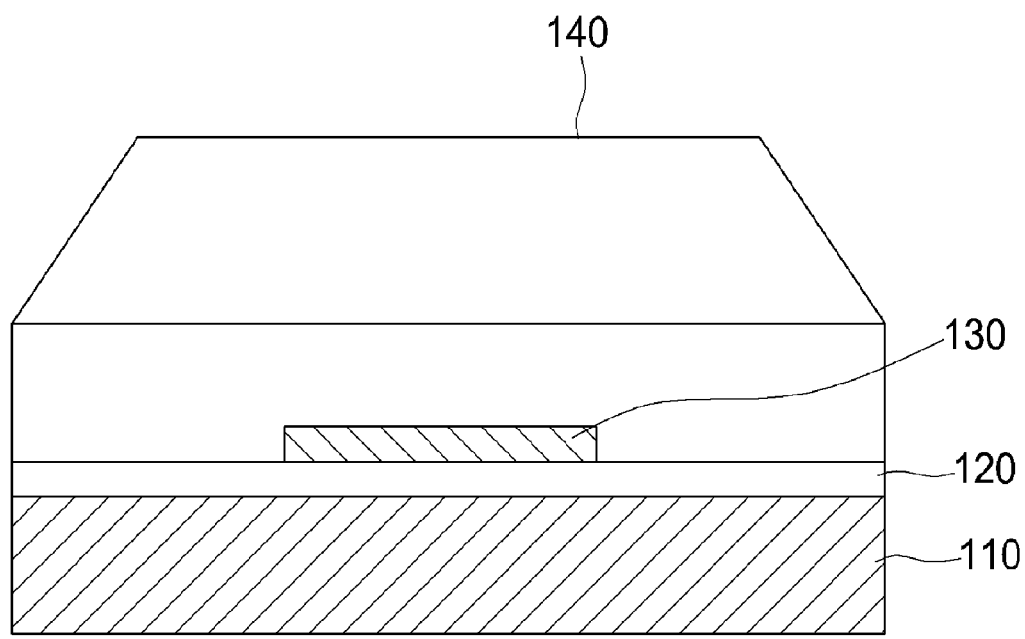

Next, as illustrated in FIG. 4D, the lower clad layer 140 is deposited on the structure. Afterward, the lower clad layer 140 is heat-treated and then it is flattened through an inductively coupled plasma (ICP) etching process.

Figure 4E:
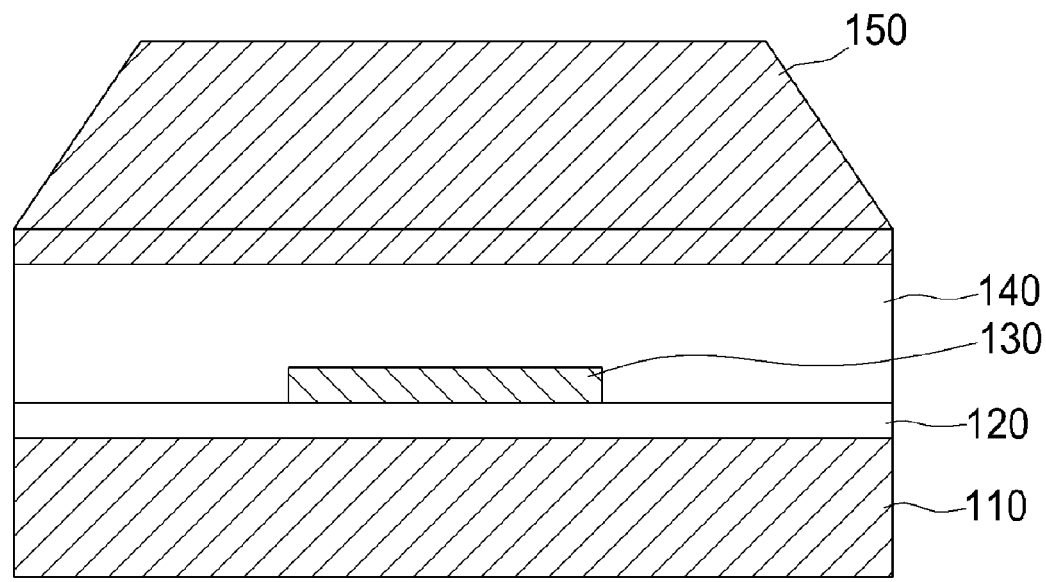

Next, as illustrated in FIG. 4E, the core layer 150 is formed on the lower clad layer 140 and the heat core layer is heat-treated and flattened through the ICP etching process.

Figure 4F:
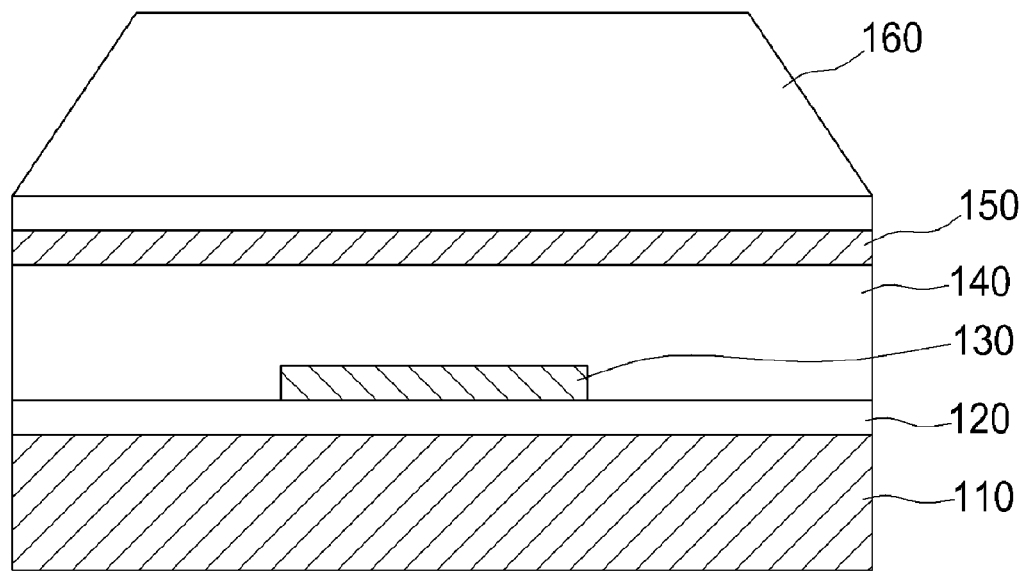

Next, as illustrated in FIG. 4F, the photo-resist layer 160 is coated over the core layer 150 and then it is heat-treated.

Figure 4G:
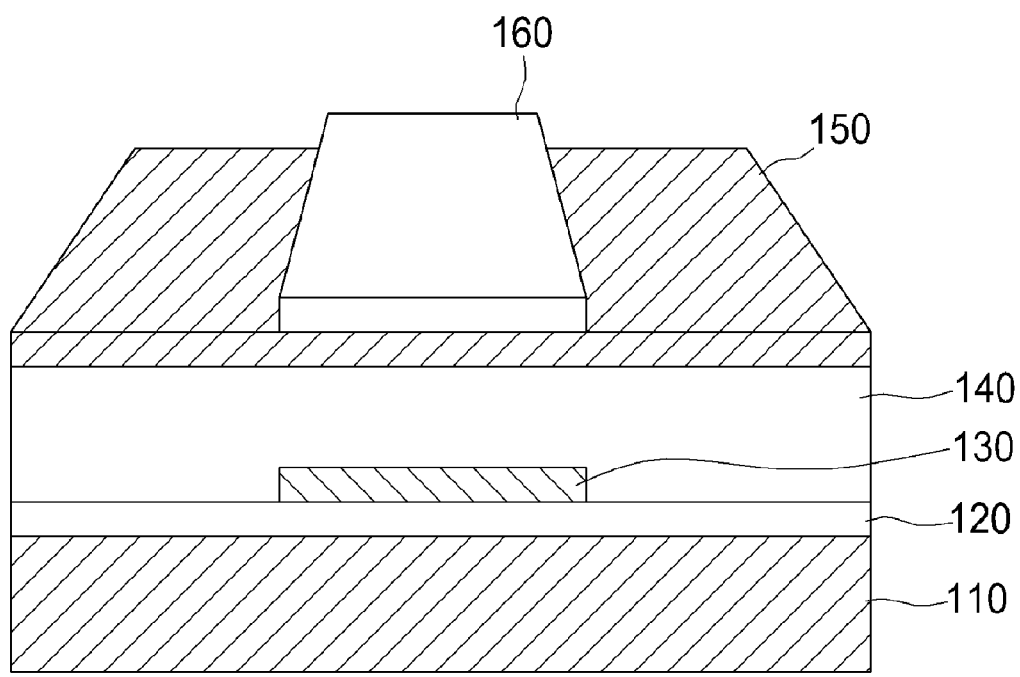

Next, as illustrated in FIG. 4G, the photo-resist layer 160 is subjected to the patterning through the lithography and developing process.

Figure 4H:
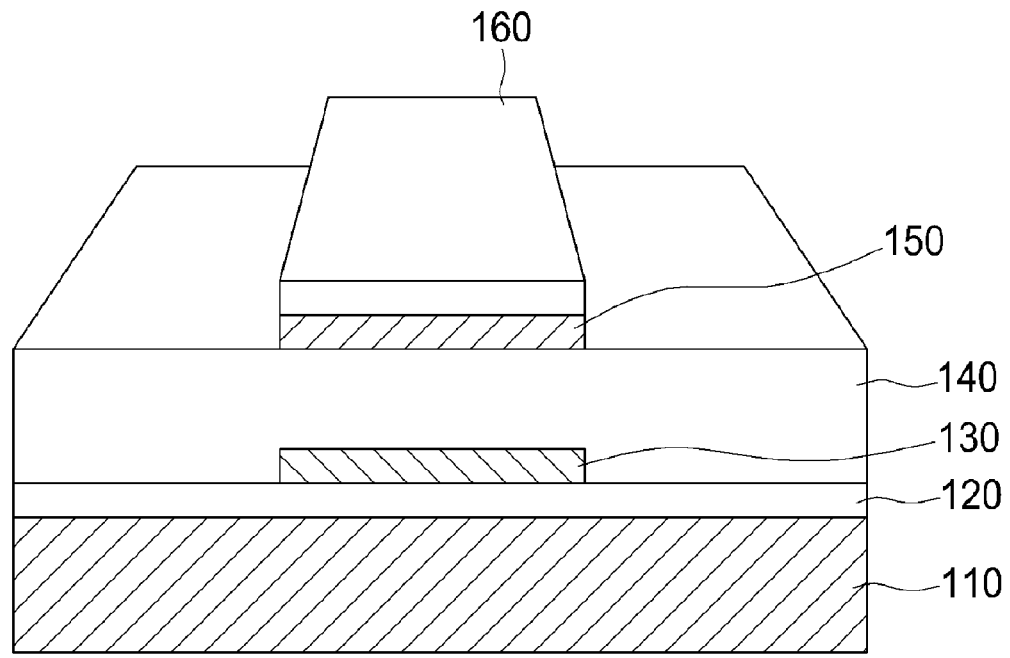
Figure 4I:
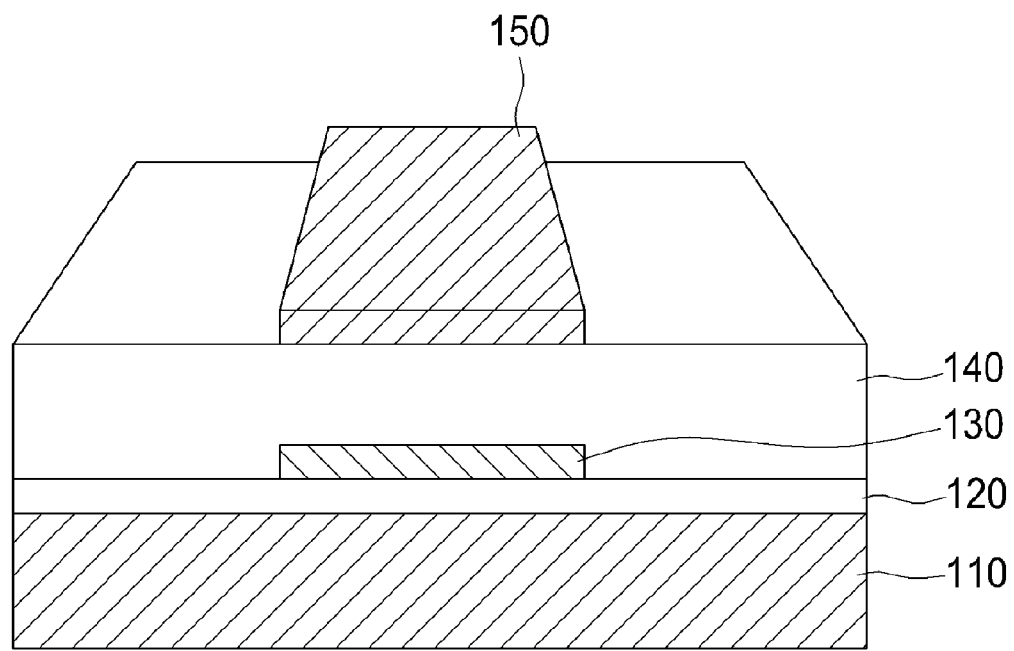

Next, as illustrated in FIGS. 4H and 4I, the core layer 150 is subjected to the ICP etching using the patterned photo-resist layer 160 as a barrier layer to thereby form the structure as shown in FIG. 4I and then the photo-resist layer 160 is removed.

Figure 4J:
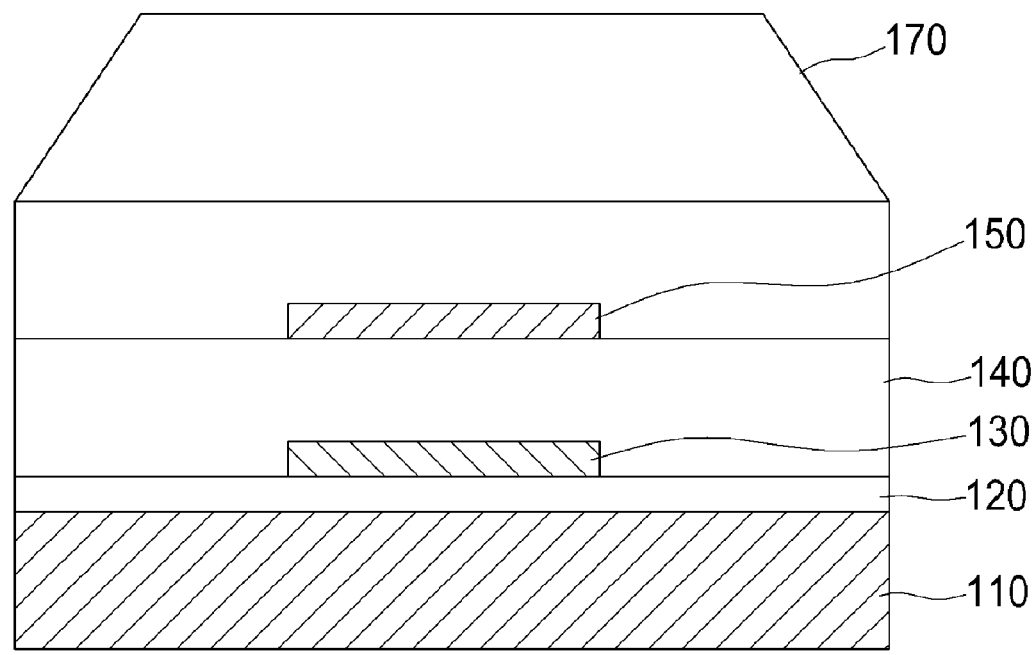

Next, as illustrated in FIG. 4J, the upper clad layer 170 is deposited on the structure with the core layer 150 formed. Afterward, the deposited upper clad layer 170 is heat-treated and then is flattened through the ICP etching process.

Finally, Pyrex™ glass is bonded to the upper clad layer 170 and then a polishing and a dicing process are performed. Afterward, the waveguide is etched. Here, it is preferable to use oxygen ($O_2$) as an etchant.

FIGS. 5A-5B and 6A-6E are simulation results illustrating nano-aperture performance with respect to an input beam SOP, wherein FIGS. 5A-5B are the simulation results showing a polarity effect during the field increasing period and FIGS. 6A-6E are the simulation results showing a polarity effect in the intensity distribution period.

FIGS. 5A-5B show variation of the electric field intensity and the power consumption when the polarity is changed from the X direction to the Y direction with a height of ridge being 70 nm.

It was possible to confirm the precipitate reduction of the electric field intensity and the power consumption when the polarity direction was changed to the Y direction. Within the range between 10 and 20 nm, it is presented that the electric field intensity changes with the difference of nearly 200 times, and the power consumption changes with the difference of nearly 20 times. It is expected that the above differences may be presented according to the polarity direction when evaluating the near field property.

As described herein before, the waveguide, the manufacturing method thereof and the HAMR head using the same of the present invention make it possible to readily grasp the location of the core by forming the metal alignment mark under the lower clad layer. Accordingly, there is the advantage in that the nano-aperture forming process of the waveguide may be readily performed without an additional active alignment.

Also, there is the additional advantage in that it is possible to readily determine the core layer and the clad layer since an offset is formed due to the difference of etching rate between the core layer and the clad layer when a dry etching is performed under the oxygen environment ($O_2$).

Also, there is the additional advantage in that it is possible to reduce the beam loss transmitting through the waveguide, to efficiently remove the polarity present in the undesired directions and to maintain the beam intensity and the shape even after the input beam passes through the nano-aperture.

Also, there is the additional advantage in that with the formation of the metal alignment mark under the lower clad layer, it is possible to efficiently remove the TM mode and to efficiently determine the location of the nano-aperture to be formed.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A manufacturing method of a waveguide comprising:
 (a) forming a metal layer of a predetermined size on a substrate;
 (b) forming a lower clad layer on the structure made in the step (a) in order to completely cover said metal layer;

(c) forming a core layer of a predetermined size on said lower clad layer at the location corresponding to said metal layer; and (d) forming an upper clad layer on the structure made in the step (c) in order to completely cover said core layer, wherein a thickness of said metal layer is formed to be about 100 nm thicker than a skin depth, wherein the skin depth comprises a depth to which an effect that a current becomes more concentrated to a surface of a conductor when a frequency becomes higher follows, and wherein the skin depth δ is represented as $$\delta = \sqrt{\frac{2\rho}{\omega\mu}},$$

where, $\rho$ is resistivity, $\omega=2\pi f$ (f: frequency) and $\mu=4\pi\times 10^{-7}$.

2. The manufacturing method as claimed in claim 1, wherein said lower clad layer and said upper clad layer are formed either from the same materials, and wherein said lower and said upper clad layers are made from the materials of which reflective coefficients are selected to be lower than that of the core layer.

3. The manufacturing method as claimed in claim 1, wherein said step (a) further comprises forming a promoter layer before forming said metal layer on said substrate.

4. The manufacturing method as claimed in claim 1, wherein said lower clad layer and said upper clad layer are formed from the different materials, and reflective coefficient of said lower clad and said upper clad layers is lower than that of the core layer.

5. The manufacturing method as claimed in claim 1, wherein the metal layer is disposed under the lower clad layer.

6. The manufacturing method as claimed in claim 1, wherein the metal layer comprises gold (Au).

* * * * *